United States Patent [19]

Conder

[11] 4,343,855

[45] Aug. 10, 1982

[54] TRANSFER FILM

[75] Inventor: Terrence M. Conder, Stillwater, Minn.

[73] Assignee: Minnesota Mining and Manufacturing Company, St. Paul, Minn.

[21] Appl. No.: 956,081

[22] Filed: Oct. 30, 1978

[51] Int. Cl.³ .............................................. C09J 7/02
[52] U.S. Cl. ................................... 428/332; 428/336; 428/339; 428/343; 428/347; 428/349; 428/354; 428/447; 428/480; 428/913; 526/194; 528/10; 528/12
[58] Field of Search ............... 428/447, 332, 336, 339, 428/343, 346, 347, 349, 354, 480, 913; 526/194; 528/10, 12

[56] References Cited

U.S. PATENT DOCUMENTS

| | | | |
|---|---|---|---|
| 3,908,645 | 9/1975 | Sandvig | 128/97 |
| 3,955,035 | 5/1976 | Ito et al. | 428/447 X |
| 4,026,826 | 5/1977 | Yoshida et al. | 528/12 |
| 4,042,749 | 8/1977 | Sandvig | 428/412 |
| 4,049,861 | 9/1977 | Nozari | 428/447 X |
| 4,069,368 | 1/1978 | Deyak et al. | 428/447 |
| 4,073,967 | 2/1978 | Sandvig | 427/44 |
| 4,084,021 | 4/1978 | Sandvig | 427/44 |
| 4,100,134 | 7/1978 | Robins et al. | 528/10 |
| 4,101,513 | 7/1978 | Fox et al. | 526/194 X |

*Primary Examiner*—Thomas J. Herbert, Jr.
*Attorney, Agent, or Firm*—Cruzan Alexander; Donald M. Sell; Mark A. Litman

[57] ABSTRACT

Preformed abrasion resistant coating layers derived from epoxy-silanes or acryloxy-silanes are applied to surfaces by means of a composite comprising a release liner, the abrasion resistant layer, and a thermosoftenable adhesive layer.

3 Claims, No Drawings

TRANSFER FILM

Coatings which offer a high degree of abrasion resistance have recently been introduced. These coatings are produced by curing ambifunctional silanes, either as homopolymers, copolymers, or blends of polymers. These ambifunctional silanes are compounds which have at least two hydrolyzable groups on a silicon atom at one end of the compound and a second and different polymerizable group at the other end. The second polymerizable group includes epoxy (e.g., glycidoxy or cyclohexane oxide), acryloxy (e.g., including methacryloxy), vinyl, and amino groups. Epoxy functionality and acryloxy functionalities have to date been found to be the preferred classes of the second reactive groups. These abrasion resistant coatings are disclosed, for example, in U.S. Pat. Nos. 3,955,035; 4,026,826; 4,049,861; 4,100,134; 4,101,513; and 4,069,368. The coating compositions are shown to comprise from 15 to 100% by weight of the ambifunctional monomers, prepolymers, or precondensates and 0 to 85% by weight of comonomers reactive with either polymerizable group.

These coating compositions may be applied to various substrates, sometimes using a primer layer to improve adhesion. Application of these coatings may be by any of the variously known coating methods such as knife edge coating, gravure coating, spray coating, wire or bar coating, spin coating, dip coating, etc. Some articles, however, do not readily lend themselves to such coating methods. For example, articles which have already been put into commerce could be easily coated only by spray methods which do not produce the highest quality coatings because of the normal variations in thickness produced by that method. It would be desirable, therefore, to be able to produce an abrasion resistant coating which could be applied to a substrate and provide a high optical quality abrasion resistant coating layer.

Films of these cured abrasion resistant coating compositions are known to be flexible, and yet they are also very brittle. Unless secured to another film or layer, they may be gently bent but cannot withstand tensile stress. For this reason, the application of a preformed abrasion resistant coating layer to a substrate would present significant problems. Heretofore, no one is believed to have attempted the lamination of a preformed abrasion resistant coating layer of the ambifunctional silanes to other surfaces because of these anticipated problems.

The present invention relates to a means for providing an optical quality abrasion resistant layer to a substrate without liquid coating of said substrate.

The present invention more particularly relates to a transfer laminate which will adhere to a substrate by means of a thermosoftenable or thermoplastic adhesive on one surface of said layer.

The present invention broadly relates to a transfer film comprising a release liner, an abrasion resistant coating layer releasably secured to the release liner and a thermosoftenable adhesive chemically bonded to said abrasion resistant coating layer, and to the method of making the transfer film.

It is surprising that this lamination will work because it would be expected that during lamination the thermosoftenable or thermoplastic adhesive softens and this would reduce the amount of necessary tensile support which is provided for the brittle abrasion resistant coating layer. Lamination with the transfer films of the present invention may be performed, however, without fracture of the abrasion resistant coating layer.

The abrasion resistant coating compositions of the present invention include only films of 3 to 25 microns in thickness derived from the epoxy-silanes and the acryloxy silanes, with the epoxy-silanes being the more preferred. These silanes may be represented by the formulae:

Formula I 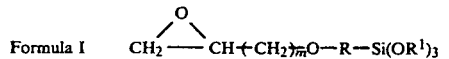

Formula II 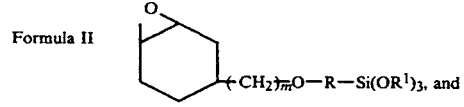

Formula III 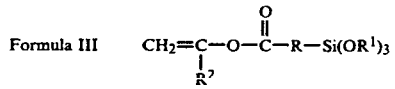

wherein
R is a divalent aliphatic non-hydrolyzable group the backbone of which is composed of C, O, S, and N atoms with no adjacent heteroatoms and bonded to the silicon atom, oxygen atom, and carbonyl group through carbon atoms (e.g., having terminal carbon atoms), said aliphatic group having from 1 to 18 carbon atoms, preferably 1 to 8 carbon atoms, and most preferably 2 to 6 carbon atoms, with alkylene groups of those numbers of carbon atoms being most preferred, $R^1$ is an aliphatic group comprising C, O, S, and N atoms having 1 to 10 carbon atoms, preferably 1 to 6 carbon atoms, and most preferably 1 to 4 carbon atoms, with alkyl groups of those numbers of carbon atoms being most preferred, $R^2$ is H or $CH_3$, and m is 1 through 6, most preferably 1 to 3.

Where the term alkylene is used, the group is composed of only C and H atoms. The compounds described by these formulae are well described in the art cited above.

Comonomers for these materials are also disclosed in the above-mentioned references. Generally, any comonomer copolymerizable with either of the reactive functionalities may be used. For example, silanes (e.g., tetra-, tri-, or dialkoxy silanes), epoxy resins (e.g., diepoxies such as diglycidyl epoxies), acrylates (e.g., polyacrylates), polyhydroxy compounds (e.g., polyols), and other well known comonomers for the respective groups may be used. With the epoxy silanes, the polyepoxy resins are preferred comonomers in amounts of from 5 to 70 percent with the epoxy-silanes constituting from 95 to 30 percent of the reactive comonomeric composition. The epoxy comonomer is particularly important in adding desired flexibility to the abrasion resistant coating system. The preferred polyepoxy resins can be described by the formula:

Formula IV

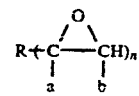

wherein
- R is an aliphatic or cycloaliphatic radical such that the epoxy compound has a molecular weight of at least 100 per epoxy group,
- n is the valence of R and is an integer of 2 to 6 (preferably 2),
- a and b are each H or are the atoms necessary so that when fused form a 5- or 6-membered cycloaliphatic ring.

R is preferably selected so that upon homopolymerization of this compound a polymer is provided which has a glass transition temperature ($T_g$) below $-25°$ C.

In particular, resins such as 1,4-butanediol diglycidyl ether, 3,4-epoxycyclohexylmethyl-2,4-epoxycyclohexanecarboxylate, 3,4-epoxy-2-methylcyclohexylmethyl-3,4-epoxy-2-methylcyclohexanecarboxylate, and bis(3,4-epoxy-6-methylcyclohexylmethyl)adipate are desirable. U.S. Pat. No. 3,117,099, particularly column 2, line 59 through column 4, line 22, discloses many other desirable epoxy comonomers.

The thermosoftenable or thermoplastic adhesive layer must be coated onto or combined with the abrasion resistant layer prior to complete curing of the abrasion resistant layer. That layer has been found to be so completely non-reactive when fully cured that thermoplastic layers will not readily bond to its surface. By placing a thermoplastic layer in contact with the abrasion resistant coating layer prior to full curing of the latter, the monomers of the abrasion resistant coating composition are able to react with available groups from the thermoplastic composition. This kind of adherence between the separate layers is referred to herein as chemical bonding. Absent such bonding, the abrasion resistant layer will tend to readily pull away from the thermoplastic layer. The thermoplastic material preferably has a softening point of between 55° and 235° C. and is between 0.2 and 50 microns, most preferably between 1 and 30 microns in thickness.

The preferred thermoplastic materials are those which contain reactive sites for the monomers which form the abrasion resistant coating layer. Examples of such materials include vinyl resins (e.g., copolymers of vinylchloride and vinylacetate, particularly those with additional monomers which are reactive with the abrasion resistant coating forming composition), poly(2,5-oxolene), polyacrylates, polyhydroxyethers, and polymers to which additives have been provided which can react with the monomers which form the abrasion resistant coating.

The release liner may be any of those release liner materials known in the art. Particularly, they must not form a bond or attachment to the abrasion resistant coating during its cure so that the coating will not be released. In particular, the liner should release from the abrasion resistant coating when a force of 0.5 to 40 grams/cm of width is applied to the liner in a direction parallel to the surface of the coating by pulling on a folded back edge of the liner. This force, when applied in this described fashion is the peel strength of the liner. The release liner may be formed of smooth polymeric film to which the abrasion resistant coating composition is not readily bondable (e.g., polyester, polyolefin, etc.), or silicone resin treated surfaces.

EXAMPLE 1

A room temperature curing abrasion resistant coating composition comprising:

(1) 300 g (40% hydrolyzed) γ- glycidoxypropyltrimethoxysilane,
(2) 4.5 g bis(trifluoromethylsulfonyl)phenylmethane, (hereinafter PDS),
(3) 0.75 g of an inert, high viscosity leveling agent, and
(4) 300 g ethyl acetate was extrusion bar coated onto polyethyleneterephthalate film (0.05 mm thick by 102 mm wide) to provide a tack free coating weight of 6.46 g/m². Within three hours, the abrasion resistant coating was overcoated with a heat-softenable adhesive composition comprising 90 g of a polymer comprising 78% by weight vinylchloride, 21% by weight vinylacetate and 1% oxirane monomers in 510 g of cellosolve acetate. The adhesive was applied then oven dried at 93.5° C. to provide a coating weight of 6.46 g/m². This laminate (transfer film) was now ready for a mechanical transfer application.

The transfer film was placed with the heat-softenable adhesive in contact with polycarbonate sheeting and compression molded in a steam-heated water cooled hydraulic press between two chrome-steel backplates to a maximum temperature of 163° C. and 14.1 kg/cm² pressure for approximately 5 minutes. The sandwich was then cooled to 60° C. and removed from the press. The polyester film peeled from the sandwich exposing the completely cured abrasion resistant surface.

The following test, hereinafter referred to as a measurement of cross-hatch adhesion, was then performed. Eleven parallel cuts, approximately 2 mm apart, were made on the abrasion resistant coating with a razor blade. Eleven more parallel cuts, now perpendicular to the first cuts so as to form a grid pattern, were made on the coating, leaving a total of 100 squares, each approximately 4 cm². 3M Type 250 paper tape was applied over the cross hatching by finger pressure, then removed by a snapping action 180° to the plastic surface. The percent adhesion was determined by counting the number of squares remaining. Falling sand abrasion resistance was determined by ASTM D968-51 with Ottawa silica sand.

In this example, cross-hatch adhesion was 100% and haze was 10.8%.

When the same transfer film was applied to polymethacrylate sheeting by compression molding at 148° C., crosshatch adhesion was 100% and haze was 21%.

EXAMPLE 2

A latent curing abrasion resistant coating comprising 300 g of a 40% hydrolyzed γ-glycidoxypropyltrimethoxy-silane, 5 g of the ammonia salt of bis(trifluoromethylsulfonyl)methane (hereinafter ABM), 40 g tetraisopropyltitanate, and 1.0 g of an inert high viscosity polymeric surfactant was extrusion bar coated onto a polyethyleneterephthalate film and dried at 94° C. to a coating weight of 12.9 g/m². This partially cured coating was overcoated by extrusion bar coating with a heat-softenable adhesive comprising 45 g of a polymer of 86% vinylchloride, 13% vinylacetate, and 1% maleic anhydride in 102 g methylethylketone, 102 g toluene, and 51 g heptane to give a dry coating weight of about 6.46 g/m². Upon transfer and pressing under the conditions of Example 1 to both of the substrates, cross-hatch adhesion was 100% in both instances and falling sand abrasion resistance was 15% haze with the polycarbonate and 18% with the acrylic sheeting.

EXAMPLES 3-8

In a manner similar to that of Example 1 the following adhesives were coated from solvent solutions over a thin coating of the abrasion resistant coating of Example 1 on polyester film before the coating had been allowed to fully cure. The transfer film was then transferred to a press and applied to polycarbonate or polyacrylate sheeting as in Example 1. In those instances where adhesion was less than 80%, abrasion resistance was not determined.

| Ex. No. | Adhesive | Adhesion Poly-carbonate | Acrylic | Abrasion Resistance Poly-carbonate | Acrylic |
|---|---|---|---|---|---|
| 3 | 86% vinylchloride 13% vinylacetate 1% maleic acid | 0 | 40 | — | — |
| 4 | poly 2,5-oxolene | 0 | 100 | — | 14.5 |
| 5 | polyhydroxyether with MW of 80,000, 0.35 hydroxy eq./100 g resin at 32% solids in cellosolve acetate | 0 | 92.5 | — | 12.3 |
| 6 | 80% vinylchloride 18% vinylacetate 2% hydroxy | 0 | 60 | — | — |
| 7 | 78% vinylchloride 21% vinylacetate 1% oxirane | 100 | 100 | 10.8 | 20.0 |
| 8 | 80% vinylchloride 19% vinylacetate 1% vinyl alcohol | 0 | 50 | — | — |

EXAMPLES 9-15

The polymers that were evaluated above as heat-softenable adhesives were also evaluated as primers, wherein they were first applied to the polycarbonate or acrylic sheeting and the abrasion resistant coating compositions subsequently applied thereto.

A primer formulation comprised of 300 g of a vinyl polymer (80% vinylchloride, 19% vinylacetate, and 1% vinyl alcohol in a 40% by weight solids solution in isopropylacetate) in 276 g ethyleneglycol monoethylether acetate was extrusion bar coated onto both polycarbonate and acrylic sheeting, then dried at 94° C. to a coating weight of 6.46 g/m². The primed sheeting was overcoated with the abrasion resistant coating composition of Example 1 to 6.46 g/m². After three days of curing at normal room temperature, cross-hatch adhesion was 100% on the polycarbonate sheeting with 16.3% haze and 0% cross-hatch adhesion with the acrylic sheeting. It is surprising that this same resin that adheres so well by itself to acrylic sheeting did not work as a heat-softenable adhesive for the transfer film laminates of the present invention. It was found, in fact, as shown by the following examples, that natural adherence of a polymer to polycarbonate or acrylic sheeting was not an indication of that polymer's usefulness as a heat-softenable adhesive for transfer film. In fact, some polymers which could not act as a primer functioned well as an adhesive.

| Ex. No. | Primer | Adhesion Poly-carbonate | Acrylic | Abrasion Resistance Poly-carbonate | Acrylic |
|---|---|---|---|---|---|
| 10 | Polymer of Example 3 | 20% | 0 | — | — |
| 11 | Polymer of Example 4 | 100% | 0 | 17% | — |
| 12 | Polymer of Example 8 | 100% | 0 | 15% | — |
| 13 | Polymer of Example 5 | 45% | 0 | — | — |
| 14 | Polymer of Example 6 | 10% | 0 | — | — |
| 15 | Polymer of Example 7 | 50% | 0 | — | — |

EXAMPLES 16-19

The following polymers were evaluated as heat-softenable adhesives according to the method shown in Example 2 using the latent catalyst containing abrasion resistant coating system of that example. The results are reported with the polymer composition.

| Ex. No | Adhesive | Adhesion Poly-carbonate | Acrylic | Abrasion Resistance Poly-carbonate | Acrylic |
|---|---|---|---|---|---|
| 16 | 86% vinylchloride 13% vinylacetate 1% maleic acid | 100% | 100% | 22.0% | 22.0% |
| 17 | Polymer of Example 8 | 100% | 100% | 23.8% | 24.2% |
| 18 | Polyhydroxylether of MW 30,000* | 0 | 0 | — | — |
| 19 | A high MW polymer of acrylic acid, ethylacrylate, and methylmethacrylate as 25% solids in 2 parts ClCH₂CH₂Cl and 1 part | 0 | 0 | — | — |

| Ex. No. | Adhesive | Adhesion | | Abrasion Resistance | |
|---|---|---|---|---|---|
| | | Poly-carbonate | Acrylic | Poly-carbonate | Acrylic |
| | 2-butanol | | | | |

*having repeating units

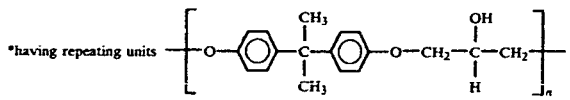

The useful adhesive composition of Example 16 did not work well in Example 3. Because of the different methods of cure used for the abrasion resistant coating layer in these examples, the adhesive was able to chemically bond to the abrasion resistant layer more easily and effectively in Example 16 than in Example 3.

EXAMPLE 20

The following materials were evaluated as primers according to the procedure of Examples 9-15. The abrasion resistant coating composition used was that of Example 2, but the procedures were otherwise identical.

| Ex. No. | Primer | Adhesion | | Abrasion Resistance | |
|---|---|---|---|---|---|
| | | Poly-carbonate | Acrylic | Poly-carbonate | Acrylic |
| 20 | Polymer of Example 19 | — | 100% | — | 21.5% |

This data again shows that materials having a natural adhesion to a substrate and which can serve as a primer for an abrasion resistant layer are not necessarily capable of functioning as a thermosoftenable adhesive in a transfer film system for abrasion resistant layers. This same material was tried as an adhesive in Example 19 and it failed. At the same time it performs as a primer.

EXAMPLES 21-25

The adhesion of the abrasion resistant coating to the release liner must be designed so that the coatings adhere to the film during coating and post-coating operations, such as slitting and sheeting, so as to prevent premature delamination, but must release easily from the film after heat transfer to the plastic support. In the following examples, the respective abrasion resistant coatings and adhesives were coated onto the appropriate release liner (film) according to the coater conditions listed in Examples 1 through 4. The number for the adhesive in the following examples indicates the adhesive by reference to the previous example in which it was used.

| Ex. No. | Abrasion Resistant Coating | Adhesive | Film |
|---|---|---|---|
| 21 | ABM | 16 | 2 mil polyethyleneterephthalate (PET) |
| 22 | ABM | 16 | 4 mil PET |
| 23 | PDS | 7 | 2 mil PET |
| 24 | PDS | 7 | 4 mil PET |
| 25 | PDS | 7 | 2 mil polyethylene |

To the primer coat was laminated a 2.54 cm (1 inch) wide strip of 3M type 250 tape, with a rubber roller. Samples were mounted in an Instron testing machine, set for a rate of 12.7 cm per minute (5 inches per minute), and the force required to peel the coating from the release films was determined.

In all cases the range of peel strengths were about 1.8 to 7.2 grams per cm widths (0.16 to 0.64 oz per inch width). This adhesion is adequate to permit the film to be made into a roll, slit or cut into sheets, yet can be easily removed from the finished part once the heat lamination step is complete.

It has been found in the practice of the present invention that the adhesion of the abrasion resistant coating to the release liner must be such that the force required to peel the liner from the coating is between 0.5 and 40 grams/cm width. Preferably the required force is between 1.0 and 25 grams/cm width.

EXAMPLES 26-27

These examples describe the use of a 97% methylmethacrylate, 3% γ-methacryloxypropyltrimethoxy silane copolymer as a transfer primer for the phenyldisulfone curing abrasion resistant coating.

In a similar manner to Example 1, a thin coating of the uncured phenyldisulfone curing abrasion resistant coating, on 2 mil polyester film, was overcoated from appropriate solvents with a copolymer of 97% methylmethacrylate-3% A-174 methacryloxysilane at 6.46 grams per square meter. The coating was transfer laminated to polycarbonate sheeting and acrylic sheeting in a hydraulic press at 163° C. (325° F.) and 149° C. (300° F.), respectively.

| Ex. No. | Adhesion | | Abrasion Resistance | |
|---|---|---|---|---|
| | Poly-carbonate | Acrylic | Poly-carbonate | Acrylic |
| 26 | 100% | 100% | 21.0% | 27.8% |

In a similar manner to Example 2, the acrylic adhesive copolymer of this example was coated on 0.51 mm (0.015 inch) thick clear polycarbonate film and 0.35 mm (0.010 inch) thick acrylic sheeting and overcoated with the uncured phenyldisulfone curing abrasion resistant coating.

| Ex. No. | Adhesion | | Abrasion Resistance | |
|---|---|---|---|---|
| | Poly-carbonate | Acrylic | Poly-carbonate | Acrylic |
| 27 | 100% | 100% | 16.7% | 21.0% |

The process of the present application is also thought to be part of the invention. The process as previously exemplified comprises the coating of a release liner film or sheet (substrate) with a composition of the monomers of Formulae I, II, and III and before complete cure thereof, applying a thermoplastic adhesive forming composition to the surface of the abrasion resistant coating layer composition so as to form a chemical bond between the abrasion resistant coating layer and the thermoplastic adhesive layer during cure of the abrasion resistant layer.

What is claimed is:

1. A transfer film sequentially comprising:
   (1) a strippable layer comprising a polymeric film selected from the class consisting of polyester and polyolefin film,
   (2) an abrasion resistant film layer of from 3 to 25 microns in thickness comprising the reaction product of a monomer selected from the class consisting of

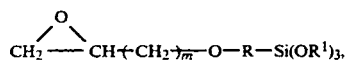

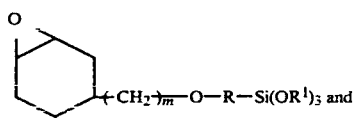

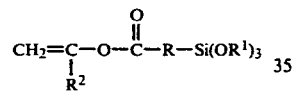

wherein
R is a divalent aliphatic nonhydrolyzable group of from 1 to 18 carbon atoms the backbone of which is composed of C, O, S, and N atoms with no adjacent heteroatoms and having terminal carbon atoms,
$R^1$ is an aliphatic group of 1 to 10 carbon atoms,
$R^2$ is H or $CH_3$, and
m is 1 to 6, and
   (3) a thermoplastic coating which is chemically bonded to said abrasion resistant coating layer.

2. The transfer film of claim 1 wherein said abrasion resistant film layer comprises a polymer which is derived from a monomer having the formula

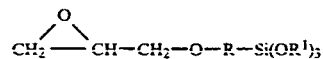

wherein
R is a divalent alkylene group of from 1 to 8 carbon atoms and
$R^1$ is alkyl of 1 to 6 carbon atoms.

3. A transfer film sequentially comprising:
   (1) a strippable layer
   (2) an abrasion resistant film layer of from 3 to 25 microns in thickness comprising the reaction product of a monomer selected from the class consisting of

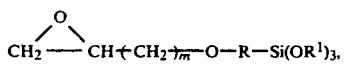

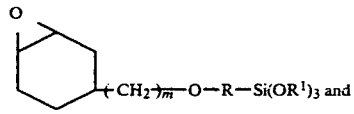

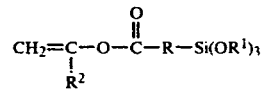

wherein
R is a divalent aliphatic nonhydrolyzable group of from 1 to 18 carbon atoms the backbone of which is composed of C, O, S, and N atoms with no adjacent heteroatoms and having terminal carbon atoms,
$R^1$ is an aliphatic group of 1 to 10 carbon atoms,
$R^2$ is H or $CH_3$, and
m is 1 to 6, and
   (3) a thermoplastic coating which is chemically bonded to said abrasion resistant coating layer wherein said thermoplastic coating is a thermoplastic adhesive selected from polymers of the class consisting of vinyl resin, poly(2,5-oxolene), polyacrylate, and polyhydroxyether.

* * * * *